(12) United States Patent
Schötz et al.

(10) Patent No.: US 10,183,886 B2
(45) Date of Patent: Jan. 22, 2019

(54) QUARTZ GLASS TUBE AS A SEMI-FINISHED PRODUCT FOR AN OPTICAL COMPONENT

(71) Applicant: Heraeus Quarzglas GmbH & Co KG, Hanau (DE)

(72) Inventors: Gerhard Schötz, Aschaffenburg (DE); Karsten Bräuer, Bruchköbel (DE); Richard Schmidt, Hammersbach (DE); Peter Bauer, Seligenstadt (DE); Andreas Schultheis, Langenselbold (DE); Clemens Schmitt, Blankenbach (DE); Andreas Langner, Freigericht (DE)

(73) Assignee: Heraeus Quarzglas GmbH & Co. KG, Hanau (DE)

(\*) Notice: Subject to any disclaimer, the term of this patent is extended or adjusted under 35 U.S.C. 154(b) by 946 days.

(21) Appl. No.: 14/372,734

(22) PCT Filed: Jan. 17, 2013

(86) PCT No.: PCT/EP2013/050776
§ 371 (c)(1),
(2) Date: Jul. 16, 2014

(87) PCT Pub. No.: WO2013/107787
PCT Pub. Date: Jul. 25, 2013

(65) Prior Publication Data
US 2015/0017440 A1   Jan. 15, 2015

(30) Foreign Application Priority Data
Jan. 17, 2012  (DE) .................. 10 2012 000 670

(51) Int. Cl.
*C03B 37/012*    (2006.01)
*C03B 37/014*    (2006.01)

(52) U.S. Cl.
CPC .... *C03B 37/01211* (2013.01); *C03B 37/0124* (2013.01); *C03B 37/01222* (2013.01);
(Continued)

(58) Field of Classification Search
CPC ......... C03B 37/01211; C03B 37/01222; C03B 37/01228; C03B 37/0124; C03B 37/01291; C03B 37/01426; Y02P 40/57
(Continued)

(56) References Cited

U.S. PATENT DOCUMENTS 4,225,330 A * 9/1980 Kakuzen ............... C03B 37/014
                                                                65/17.4
6,477,307 B1   11/2002 Tankala et al.
(Continued)

FOREIGN PATENT DOCUMENTS

EP   1000909 B1   7/2003
EP   2337166 A1   6/2011
(Continued)

OTHER PUBLICATIONS

Photonic-crystal fiber characteristics benefit numberous applications, Richard Ramsay, SPIE, 2008.*
(Continued)

*Primary Examiner* — Vincent Tatesure
(74) *Attorney, Agent, or Firm* — Tiajoloff & Kelly LLP

(57) ABSTRACT

A quartz glass tube as a semi-finished product for an optical component that has an inner bore extending along a tube center axis for the acceptance of a core rod and a tube wall limited by an inner casing surface and an outer casing surface is already known; within said tube wall an inner region made of a first quartz glass and an outer region made of a second quartz glass with a different index of refraction surrounding the inner region contact one another at a contact surface which runs around the center axis. In order to (Continued)

provide a quartz glass on this basis that facilitates the production of optical components for special applications such as laser-activated optical components in wand or fiber form, the invention states that the contact surface has a non-round course in the radial cross-section and the inner casing surface has a circular course.

10 Claims, 2 Drawing Sheets

(52) U.S. Cl.
 CPC .. *C03B 37/01228* (2013.01); *C03B 37/01291* (2013.01); *C03B 37/01426* (2013.01); *C03B 2201/12* (2013.01); *C03B 2201/31* (2013.01); *C03B 2203/04* (2013.01); *C03B 2203/12* (2013.01); *C03B 2203/23* (2013.01); *C03B 2203/31* (2013.01); *C03B 2203/32* (2013.01); *C03B 2203/34* (2013.01); *Y02P 40/57* (2015.11); *Y10T 428/2935* (2015.01)

(58) Field of Classification Search
 USPC .......................................................... 442/59
 See application file for complete search history.

(56) References Cited

U.S. PATENT DOCUMENTS

| | | |
|---|---|---|
| 7,003,206 B2 | 2/2006 | Tankala et al. |
| 7,089,765 B2 | 8/2006 | Schaper et al. |
| 7,313,312 B2 | 12/2007 | Kimball et al. |
| 8,635,889 B2 | 1/2014 | Vydra et al. |
| 2002/0136515 A1 | 9/2002 | Schaper et al. |
| 2003/0031444 A1 | 2/2003 | Croteau et al. |
| 2003/0059184 A1 | 3/2003 | Tankala et al. |
| 2005/0008313 A1 | 1/2005 | Tankala et al. |
| 2005/0254764 A1 | 11/2005 | Chatigny |
| 2005/0271347 A1 | 12/2005 | Kimball et al. |
| 2006/0088261 A1 | 4/2006 | Berkey et al. |
| 2011/0100062 A1 | 5/2011 | Vydra et al. |

FOREIGN PATENT DOCUMENTS

| | | |
|---|---|---|
| JP | 2007153697 A | 6/2007 |
| JP | 2012002959 A | 1/2012 |
| WO | 02/059660 A1 | 8/2002 |
| WO | 02088801 A2 | 11/2002 |
| WO | 2005/082801 A3 | 9/2005 |
| WO | 2010/003856 A1 | 1/2010 |

OTHER PUBLICATIONS

Fabrication and Characterization of Yb 3+: Er3+ Phosphosilicate Fibers for Lasers, Vienne et al., Journal of Lightwave Technology vol. 16., No. 11, Nov. 1998.*
Espacenet. English language abstract of EP 2337166 A1 (Thierry et al.) published Jun. 22, 2011.
Patent Abstracts of Japan. English Language Translation of JP 2007 153697 A, published Jun. 21, 2007.
Patent Abstracts of Japan. English Language Translation of JP 2012 002959 A, published Jan. 5, 2012.

* cited by examiner

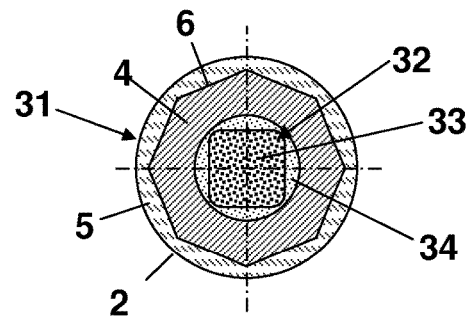
Fig. 9
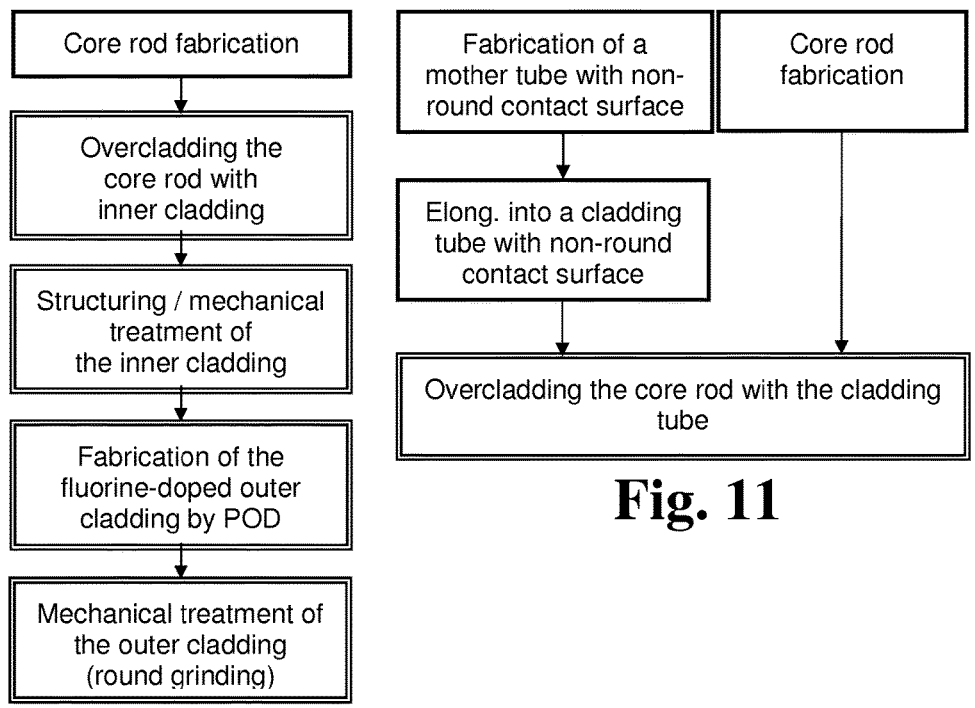
Fig. 10 (Prior Art)
Fig. 11

QUARTZ GLASS TUBE AS A SEMI-FINISHED PRODUCT FOR AN OPTICAL COMPONENT

The present invention refers to a quartz glass tube as a semi-finished product for an optical component, which comprises an inner bore extending along a tube center axis for accommodating a core rod and a tube wall defined by an inner cladding surface and an outer cladding surface, said wall comprising an inner region of a first quartz glass and an outer region of a second quartz glass, which surrounds the inner region, said inner region and said outer region are adjacent to each other on a contact surface which extends around the center axis, the refractive indices of said first quartz glass and said second quartz glass differing from each other.

Furthermore, the invention is concerned with a method for producing such a quartz glass tube.

PRIOR ART

EP 1 000 909 A1 suggests a substrate tube of quartz glass which shows a non-homogeneous distribution of the refractive index over its wall. To achieve this, an inner layer facing the inner bore of the substrate tube is doped with germanium oxide and thereby accomplishes a refractive-index increase in comparison with undoped quartz glass. The adjoining outer layer has a comparatively low refractive index.

The substrate tube serves to produce standard preforms for optical fibers according to the so-called MCVD inside deposition method (Modified Chemical Vapor Deposition). The doped inner layer of the substrate tube can here replace a part of the glass material that must otherwise be produced in a complicated way by inside deposition, which reduces the costs of the manufacturing process for the preform.

The core glass of an optical preform is however often provided as a so-called core rod which with the help of a rod-in-tube method is surrounded or overclad with additional cladding material. This cladding material is present in tubular form, if necessary, and forms a semi-finished product within the meaning of the present invention.

Such a generic quartz glass tube as a semi-finished product for overcladding a core rod is known from WO 2010003856 A1. In this quartz glass tube, a circular inner bore is surrounded by a tube wall which is composed of three layers, namely of an inner layer of quartz glass, a ring zone layer surrounding the inner layer and consisting of fluorine-doped quartz glass with a comparatively low refractive index, and with an outer layer surrounding the ring zone layer.

This configuration of the wall of the cladding region turns out to be useful for the manufacture of an optical fiber with low bending sensitivity. The present invention, however, is not so much concerned with optical standard fibers, but regards laser active special fibers or components. One or several laser active core zones are surrounded by a cladding region which serves light conduction and so-called "optical pumping". Laser light is here injected into the core zone and excites laser active ions that are present there. A light pulse extending through the core zone additionally absorbs energy from the excited ions and is thereby amplified, or the laser active substances are excited by the injected pump light so as to output laser light.

Such optical components are often provided with a plurality of cladding layers, the cross-sectional area of at least one cladding layer differing from the circular form. In the optical component this deviation effects a change in the light conduction within the pump light zone. Light modes (so-called helix modes) are thereby particularly obstructed and changed, which otherwise extend around the core zone without being coupled in. The symmetry change in the cladding region thereby contributes to a more efficient injection of the pump light into the core zone.

An optical fiber of this type is e.g. known from US 20030031444 A1. A core region of laser active quartz glass is surrounded by an inner glass cladding of quartz glass with a lower refractive index than the core region, and said glass cladding, in turn, is surrounded by an outer glass cladding of quartz glass having a refractive index smaller than that of the inner glass cladding. Both glass claddings are octagonal in radial cross-section; the core region is circular.

The fiber is drawn from a preform for the fabrication of which two methods are indicated. The two methods have in common that a standard circular core rod is provided, which comprises the core zone and an inner glass cladding enveloping said core zone. The core rod is ground, so that the inner glass cladding is given an octagonal outer geometry. The outer glass cladding is subsequently applied by means of plasma outside deposition method (POD method; Plasma Outside Deposition) or by collapsing a separately produced cladding tube.

TECHNICAL OBJECT

The quartz glass of the core rod normally satisfies very high demands made on purity and optical quality, so that the core rod constitutes an essential cost factor in the manufacture of preforms. Grinding of the inner glass cladding may lead to total loss of the core rod in the known method.

When the outer glass cladding is deposited by means of the POD method, another problem will arise. Due to the process high-energy UV radiation is generated that may damage the UV-sensitive core materials.

It is the object of the present invention to provide a semi-finished product which particularly facilitates the production of optical components for special applications, such as laser active optical components in rod or fiber form. Furthermore, it is the object of the present invention to indicate an inexpensive method for producing such a quartz glass tube.

GENERAL DESCRIPTION OF THE INVENTION

As for the quartz glass tube, this object starting from a quartz glass tube of the aforementioned type is achieved according to the invention in that the contact surface in radial cross-section has a non-round profile and the inner cladding surface has a circular profile.

The tubular quartz glass tube according to the invention provides, on the one hand, a circular inner bore and, on the other hand, an inhomogeneous refractive index distribution over the tube wall, wherein at least one contact surface between the regions of different refractive indices is within the tube wall which differs from the above-described known quartz glass tube in that it is not circular.

This quartz glass tube shall also be called "cladding tube with non-round contact surface" hereinafter. It is in principle useable in the MCVD or other inside deposition methods as a substrate tube, but it is particularly suited and configured for overcladding at least one further quartz-glass component, such as a tube or a core rod.

A core rod may be a rod of a laser active glass in which a central core glass region is surrounded by a cladding region of which at least a part is provided in the form of the quartz glass tube.

When used for an MCVD method or a comparable inside deposition method, the circular inner bore facilitates a defined layer formation.

When used for overcladding, another quartz-glass component with a round outer circumference, such as e.g. the core rod of a circular cross-section or a round tube, is inserted into the circular inner bore. An annular gap remains between the components. The quartz glass tube is collapsed onto the further quartz glass component and fused therewith. In comparison with other gap geometries, the annular gap facilitates collapsing and fusing.

It is particularly important that the non-round profile of the contact surface within the tube wall is already fixedly predetermined. As a result, one does not have to perform any grinding of the cladding that is required in the prior art for producing the non-round structure in case of a direct connection with the core rod. In the invention the intermediate products "core rod" and "cladding tube with non-round contact surface" are separately produced and finished and the two intermediate products are combined to form the preform only in the last stage-during overcladding. This reduces the number of the process steps in which the core rod is involved, so that the risk of damage to the core rod is reduced.

The deviation of the contact surface from the circular form breaks the rotational symmetry around the tube center axis and thereby effects a change in the light conduction within the cladding region in the optical component. Specifically, light modes (so-called helix modes) are thereby impeded and changed; otherwise, these run around the core zone and cannot easily be coupled into the core zone. This leads to a more efficient injection of the pump light into the core zone and thereby increases the pump efficiency.

The "inner region" of the cladding tube directly adjoins the circular inner bore, or it is offset further to the outside within the tube wall, i.e. defined inwards by another quartz glass with a different refractive index. At any rate it is directly surrounded by the "outer region". The "outer region", in turn, adjoins the outer cladding surface, or it is offset within the tube wall further to the inside, i.e. directly surrounded by a further cladding material with another refractive index.

The quartz glass tube is particularly suited for the production of preforms for laser active fibers that for the above-mentioned reason are to be equipped with a cladding region that is not rotation-symmetrical with respect to the component center axis. It can simultaneously be equipped with a plurality of core rods, which improves productivity. It is however also advantageous for other applications, e.g. for test purposes; whenever different core rods are to be tested or qualified, a preform must be produced in a complicated manner according to the known method for each core rod. By contrast, the use of a cladding tube with a non-round contact surface permits the simultaneous overcladding of different core rods in a tube.

The inner diameter of the quartz glass tube is within the range of a few millimeters, typically in the range of 5 mm to 20 mm, and the thickness of the tube wall is at least 1 mm. The outer diameter of the quartz glass tube is more than 2.5 mm, preferably more than 7.5 mm, and it is typically within the range of 20 mm to 30 mm.

As has already been explained above, the non-round profile of the contact surface has the effect that it breaks the rotational symmetry around the center axis of the quartz glass tube. A particularly efficient breaking of the rotational symmetry is accomplished when the profile of the contact surface in the radial cross-section has at least one corner.

Here, a "corner" means a discontinuity in the radial extension of the contact zone on a macroscopic scale; the corner point may be rounded off. An ideal corner point within the meaning that two boundary lines of two sides meet there at an angle without any rounding is difficult to produce technically and is also not necessary for achieving the desired effect. One or more rounded corner points also fulfill this purpose.

In the simplest case the contact surface in radial cross-section shows a polygonal profile.

The polygonal profile of the contact surface, for instance with a hexagonal or octagonal form in cross section, can be relatively easily produced by mechanical treatment of a start body of quartz glass or by hot forming of a softened quartz glass mass by means of molds or drawing nozzles.

An ideal polygonal geometry does not have to be set and, in practice, can often also not be achieved without taking great efforts. For instance, rounded portions of the corners of the polygon are innocuous.

As an alternative, the contact surface in radial cross-section shows a profile with alternatingly straight and curved longitudinal sections or with longitudinal sections alternatingly curved to the left and right side.

In comparison with a simple circular form, this constitutes a geometrical change which is especially efficient for avoiding helix modes. The inner cladding surface is provided at one side or at several (preferably opposite sides) with planar surfaces or slightly inwardly (concavely) curved surfaces, so that one or more flat portions of the circular shape are produced. The embodiment with a flat portion is also called "D shape" in the literature; the one with two or four opposite flat portions also "double D shape" or "fourfold D shape".

Helix modes are avoided in a particularly efficient manner by an embodiment in which the contact surface between inner and outer region is a first contact surface which is surrounded within the tube wall by a second contact surface, the second contact surface also defining portions of quartz glass with different refractive indices and having a profile which is non-circular in radial cross-section.

It has turned out to be useful when the outer cladding surface has a circular profile.

The circular outer cladding surface of the quartz glass tube facilitates its further processing into the optical component.

The quartz glass tube may comprise one or plural, eccentrically arranged inner bores which are filled with a laser active core glass. When the optical component made therefrom is used as a laser, the eccentric arrangement of the core zone has advantages when pump light is injected, for the core zone is thereby shifted into a region of the component in which it is not so much hit by the pump light injected at the front side. This reduces the absorption of the pump light in the area of the injection surface. Moreover, an eccentric arrangement of the core zone can also be cooled more easily from the outside.

However, beam guidance and particularly outcoupling of the laser radiation pose problems in the case of an eccentric arrangement of the inner bore.

These drawbacks are thus avoided by a preferred embodiment of the quartz glass tube in which the inner bore concentrically extends relative to the center axis.

It has turned out to be advantageous when the quartz glass of the outer region is doped with fluorine.

Fluorine can be introduced into quartz glass relatively easily and homogeneously also at high concentrations of up to 9% by wt, preferably in the range between 1% by wt. to 5% by wt. As is known, the doping of quartz glass with fluorine effects both a reduction of the refractive index and a decrease in viscosity. Due to the reduction of the refractive index the quartz glass of the outer region is of benefit to light conduction.

In this connection it also turns out to be advantageous when the inner portion consists of undoped quartz glass.

In a preferred embodiment of the quartz glass tube it is provided that the tube wall comprises an inner layer which extends between inner bore and inner region and which consists of quartz glass having a higher refractive index than undoped quartz glass.

The higher refractive index of the inner layer is achieved by doping the quartz glass with one or several dopants such as germanium, lanthanum, Cer, aluminum. The refractive index of the inner layer is thereby adapted to that of the core rod. In this case the radial refractive index profile has a pedestal adjoining the core rod region with an increased refractive index, which is called "pedestal design".

As for the method for the inexpensive production of the quartz glass tube according to the invention, the above-mentioned object is achieved according to the invention in that a mother tube of quartz glass is produced that has a tube wall within which an inner region of a first quartz glass and an outer region of a second quartz glass, which surrounds said inner region, are adjacent to each other on a radially extending contact surface which is non-circular in cross section, the refractive indices of said first quartz glass and of said second quartz glass being different, and the mother tube being elongated into a quartz glass strand without any tool and sections being cut therefrom to length.

In the method according to the invention a mother tube is first provided in the wall of which at least two cladding regions of quartz glass with different refractive indices are provided that share a non-circular contact surface extending around the longitudinal axis of the tube. The cladding region is in this sense provided with a non-round contact surface.

In an elongation process the above-explained quartz glass tube is produced from the thick-walled mother tube. The total length of the tubular quartz glass tubes obtained thereby is many times greater than that of the initial mother tube without additional coating or processing operations being required. Hence, when using the quartz glass tube produced in this way, optical components such as preforms and optical fibers can be produced in a particularly inexpensive manner in that the manufacturing costs of the mother tube are distributed over several components and the total costs are thus reduced per component.

In a preferred method variant in which the inner bore of the resulting tubular quartz glass tube is formed without any tool, an inner surface which is smoothed by hot deformation is obtained in a particularly high surface quality.

Preferably, in the elongation process a draw ratio in the range of 3 to 100, preferably of less than 40, is set.

The greater the draw ratio (the ratio of the tube lengths after and before the elongation process), the smaller are the efforts required for the manufacture of the mother tube, based on the total length of the quartz glass tubes obtained. At draw ratios below the said lower limit a significant effect is no longer achieved in this respect. At draw ratios above the said upper limit particularly large-volume mother tubes must be elongated, which makes handling in the elongation process more difficult.

It has turned out to be advantageous when the inner bore of the mother tube is flushed with a flushing gas in the elongation process.

This counteracts the penetration of impurities into the inner bore of the quartz glass tube and a deterioration of the surface quality of the tube wall.

EMBODIMENT

The invention shall now be explained in more detail with reference to embodiments and a drawing. In detail, in a schematic representation, FIG. 1 shows a first embodiment of a cladding tube with a non-round contact surface with round outer cladding surface in a radial cross-section;

FIG. 9 shows a preform produced by using the quartz glass tube according to FIG. 1 for a laser fiber with a rectangular core zone, in radial cross-section;

FIG. 10 shows a flow diagram with method steps for producing a preform according to the prior art; and FIG. 11 shows a flow diagram with method steps for producing a preform according to the invention.

Figure 1:
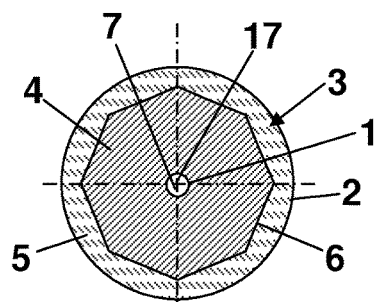

In the quartz glass tube which is schematically shown in FIG. 1, an inner cladding surface 1 of circular cross-section and an outer cladding surface 2 which is also circular define a tube wall 3 which is composed of an inner cladding region 4 and an outer cladding region 5. The inner bore is designated with reference numeral 7. The contact surface 6 between inner and outer cladding region is octagonal in the radial cross-section. The cladding structure of the quartz glass tube has an eight-fold symmetry relative to a rotation about the center axis 17, which extends in coaxial fashion relative to the inner bore 7.

To the extent that identical reference numerals are used in FIGS. 2 to 9 as in FIG. 1, this designates the same or equivalent components and constituents of the cladding tube as in FIG. 1.

Figure 2:
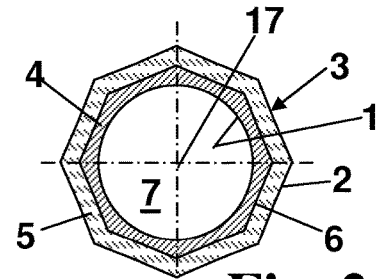
FIG. 2 shows a second embodiment of a cladding tube with a non-round contact surface with polygonal outer cladding surface.

The embodiment of FIG. 2 also shows an octagonal contact surface 6 between inner cladding region 4 and outer cladding region 5. This is a particularly thin-walled tube also having an eightfold symmetry of the cladding structure. In contrast to the embodiment of FIG. 1, the outer cladding surface 8 is also of an octagonal type, so that the outer cladding region 5, viewed both in longitudinal direction and in radial direction, has an approximately constant thickness.

Figure 3:
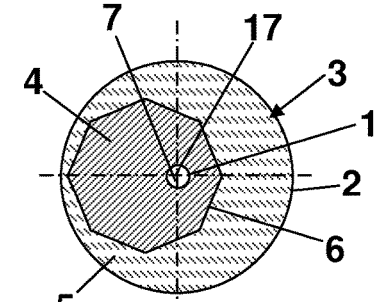
FIG. 3 shows a third embodiment of a cladding tube with a non-round contact surface which does not concentrically extend around the inner bore.

The essential characteristic in the embodiment of FIG. 3 as compared with that of FIG. 1 is that the inner cladding region 4, which is also made octagonal, has a center of gravity which is laterally offset relative to the inner bore 7.

The contact surface 6 extends in parallel with the center axis 17, but not coaxial thereto. This cladding structure only shows mirror symmetry around a mirror plane extending through the center axis 17. The width of the outer cladding region 5 varies when viewed in radial direction.

Figure 4:
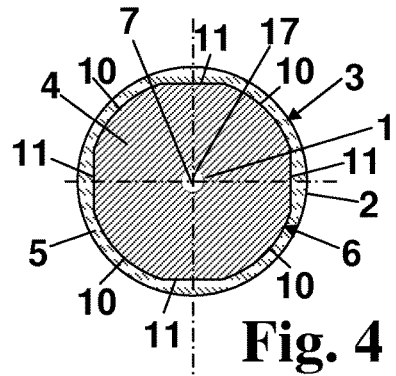
FIG. 4 shows a fourth embodiment of a cladding tube with a non-round contact surface with a cross-sectional geometry that is D-shaped four times, in the cladding region.

FIG. 4 schematically shows another cross-sectional geometry of the inner cladding region which differs from the circular form, namely a contour with a so-called "fourfold D shape." The contact surface 6 has four bent longitudinal sections 10, one in each quadrant, which are interconnected by straight or slightly inwardly curved longitudinal sections 11. This cladding structure has fourfold symmetry.

In the embodiments described with reference to FIGS. 1 to 4, the inner cladding region 4 consists each time of undoped quartz glass and the outer cladding region 5 of a fluorine-doped quartz glass with a refractive index which is reduced by comparison with the inner cladding region 4.

Figure 5:
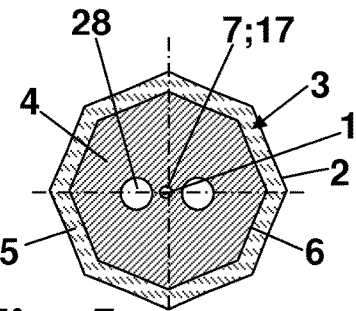
FIG. 5 shows a fifth embodiment of a cladding tube with a non-round contact surface with additional bores laterally offset relative to the center axis.

In the cross-sectional representation of FIG. 5 one can see that two additional bores 28 are provided in the cladding region, laterally offset relative to the inner bore 7 and at both sides of the center axis 17. These serve to accommodate so-called "stress rods" for the production of a preform for polarization-maintaining optical fibers.

Figure 6:
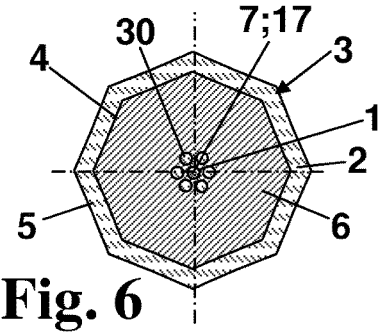
FIG. 6 shows a sixth embodiment of a cladding tube with a non-round contact surface with multiple additional bores distributed around the central inner bore.

In the embodiment shown in FIG. 6, six additional bores 30 are provided in the cladding region 4; these are evenly distributed around the inner bore 7 and the center axis 17. These serve e.g. to accommodate laser active quartz glass.

Figure 7:
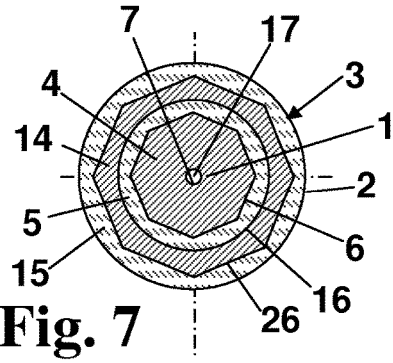
FIG. 7 shows a seventh embodiment of a cladding tube with a non-round contact surface with two concentric contact surfaces.

The embodiment shown schematically in FIG. 7 of a cladding tube with non-round contact surface differs from that of FIG. 2 in that the outer cladding region 5 is outwardly followed by two further cladding layers. Two cladding regions 4, 14 of undoped quartz glass and two cladding regions 5, 15 of fluorine-doped quartz glass are provided, with regions of undoped and doped quartz glass alternating in radial direction from the inside to the outside. The cladding regions 4, 14 of undoped quartz glass have each an inner boundary which is circular in cross section and an octagonal outer boundary, and the exact opposite can be observed in the case of the cladding regions 5, 15 of fluorine-doped quartz glass. As a result, two of the contact surfaces 6, 16, 26 are octagonal in cross section (6, 26); the other is circular (16).

Figure 8:
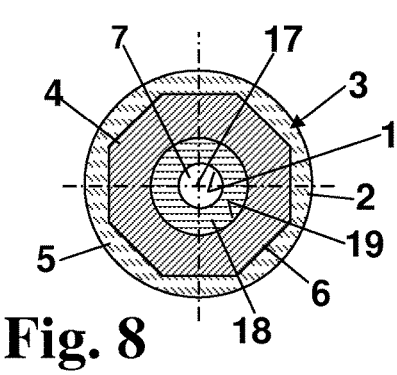
FIG. 8 shows an eighth embodiment of a cladding tube with a non-round contact surface and a refractive index profile with so-called "pedestal design"

FIG. 8 schematically shows an embodiment of the cladding tube according to the invention with a non-round contact surface in which the innermost cladding region 18 adjoining the inner bore 7 has a circular contact surface 19 with respect to the next cladding region 4. Here, the cladding region 4 represents the "inner cladding region" within the meaning of the invention, for it possesses the non-circular contact surface 6 with respect to the outwardly adjoining outer cladding region 5. The innermost cladding region 18 which adjoins the inner bore 7 consists of quartz glass which due to doping with germanium oxide has a refractive index which is adapted to that in the outer region of the core rod to be inserted into the inner bore (not shown in the figure). This embodiment can be designated as a "pedestal design".

When the cladding tube with non-round contact surface is used as a pump light cladding for a cladding-pumped laser, the contours of the contact surfaces 6, 26 which differ from the circular geometry and are within the tube wall reduce the formation of undesired helix modes. The efficiency of the pump light is thereby improved. Since these contours are provided in a quartz glass tube having a circular inner bore, which can be used as a quartz glass tube for component production, namely as an overcladding tube for overcladding a circular core rod, the manufacturing process is simplified and the risk of material losses is reduced.

The preform which is schematically shown in cross section in FIG. 9 is produced by using a cladding tube 31 with a non-round contact surface. The cladding tube 31 provides the outer cladding region 5 of fluorine-doped quartz glass and the inner cladding region 4 of undoped quartz glass. The cladding regions 4 and 5 surround a core rod 32 which is composed of a central core zone 33 with square cross-section and of a cladding layer 34. The cladding layer 34 surrounds the core zone 33 of a square cross-section such that, when viewed in cross section, a round profile is obtained having an outer diameter adapted to the diameter of the inner bore of the cladding tube 31. The core zone 33 consists of quartz glass which is doped with laser active substances. The cladding zone 34 consists of undoped quartz glass.

For the production of the preform a glass cladding of undoped quartz glass is produced by means of a POD method on a rod of a square cross-sectional area which consists of laser active quartz glass, and said glass cladding is ground to become round. The core rod 32 obtained in this way is overclad with the cladding tube 31 while forming the preform. A laser fiber which is distinguished by a square beam profile is drawn from the preform.

The manufacture of the cladding tube with non-round contact surface is now explained in more detail with reference to FIG. 1.

A thick-walled hollow cylinder of undoped quartz glass with an inner diameter of 10 mm and an outer diameter of 100 mm is provided. The outer cladding surface is given an octagonal shape by way of grinding. After mechanical treatment the quartz glass surface is etched with fluoric acid and cleaned with ethanol to remove grinding residues. The treated surface is subsequently vitrified and sealed by hot polishing.

The quartz glass cylinder obtained thereby with an octagonal cross-sectional area is provided by means of plasma outside deposition method (POD method) with an outer cladding consisting of a fluorine-doped quartz glass.

The outer contour of the quartz glass layer deposited thereby substantially assumes the octagonal shape of the quartz glass cylinder. To achieve a round tube geometry, the outer glass cladding is ground to become round and is subsequently cleaned with hydrofluoric acid to remove grinding traces, and the ground surface is fire-polished to seal the surface.

The inner wall of the quartz glass tube obtained in this way is subjected to a hot-gas etching process using $SF_6$ to clean the surface.

The mother tube obtained thereby is elongated in a drawing process at a draw ratio of 30 without any tool to an outer diameter of 20 mm. During the elongation process the inner bore of the mother tube or of the drawn-off tubular strand is flushed with nitrogen. The quality of the inner surface is further improved, and plural structured cladding tubes are made from one batch, which reduces the manufacturing costs.

After the grinding process the mother tube has a geometric exact polygon shape. During etching and especially due to the elongation process the corners of the polygon may become round to a certain extent. Moreover, the quartz glass of the mother tube is softened in the elongation process, so that the straight surfaces of the polygon are also deformed and, depending on the drawing conditions, may be curved inwards or outwards in the finished quartz glass tube.

In a modification of this procedure, a solid cylinder of undoped quartz glass is used as the starting material instead of the tube. After the grinding operation and the POD process a central inner bore is produced in the solid cylinder by core drilling. In this variant, a very exact concentricity of core hole and center axis can be realized more easily.

By subdividing the manufacturing steps of the preform into cladding tube production on the one hand and core rod production on the other hand, the components are combined only in the last step, the overcladding step, to form the preform. This reduces the number of the process steps in which the core rod is involved, and lowers the risk that the core rod gets destroyed. This is also illustrated by the comparison of the flow diagrams of FIG. 10 and FIG. 11, which name the method steps for producing a preform, in which the core rod is involved (the frame is marked with double lines where necessary). FIG. 10 specifies the method steps needed for this purpose in the known method mentioned at the outset, and FIG. 11 shows the single method step, namely overcladding the core rod, in the method according to the invention.

As an alternative to this, the overcladding of the core rod with the quartz glass tube according to the invention may also be carried out in the fiber drawing process in that an assembly consisting of the cladding tube and the core rod is supplied to a heating zone, softened therein zone by zone and thereby fused and directly drawn into the fiber. The use of the cladding tube with non-round contact surface is especially recommended in the case of very expensive core rods or in the case of core rods which are particularly sensitive mechanically, thermally or to UV radiation. The costs per unit can be lowered by producing a large structured cladding tube batch in a single elongation process. Moreover, the production of several preforms of constant quality is easier because process fluctuations arising in the individual production do not occur. Moreover, a large cladding tube is equipped with a plurality of different core materials and thereby tested and qualified more easily. This is particularly helpful in saving time and costs in the development of new core materials.

The invention claimed is:

1. A quartz glass tube comprising:
   a tube wall having an inner surface and an outer surface, with said inner surface defining an inner bore extending along a tube center axis, and
   said tube wall comprising an inner region of a first quartz glass surrounding the inner bore and an outer region of a second quartz glass surrounding the inner region,
   wherein said inner region and said outer region are adjacent to each other on a contact surface that extends around the center axis,
   wherein said first quartz glass and said second quartz glass have refractive indices that differ from each other, and
   wherein in a radial cross-section the contact surface has a non-round profile and the inner surface has a circular profile.

2. The quartz glass tube according to claim 1, wherein the contact surface in the radial cross-section has at least one corner.

3. The quartz glass tube according to claim 1, wherein the contact surface in the radial cross-section has a polygonal profile.

4. The quartz glass tube according to claim 1, wherein the contact surface in the radial cross-section has a profile with alternatingly straight and curved longitudinal sections or with longitudinal sections alternatingly curved to left and right sides thereof.

5. The quartz glass tube according to claim 1, wherein the contact surface between the inner region and the outer region is a first contact surface surrounded within the tube wall by a second contact surface, the second contact surface also defining regions of quartz glass with different refractive indices and having a profile that is non-circular in the radial cross-section.

6. The quartz glass tube according to claim 1, wherein the outer surface has a circular profile.

7. The quartz glass tube according to claim 1, wherein the inner bore extends concentrically relative to the center axis.

8. The quartz glass tube according to claim 1, wherein the quartz glass of the outer region is doped with fluorine.

9. The quartz glass tube according to claim 1, wherein the inner region consists of undoped quartz glass.

10. The quartz glass tube according to claim 1, wherein the tube wall comprises an inner layer that extends between the inner bore and the inner region, and that consists of quartz glass having a higher refractive index than undoped quartz glass.

* * * * *